United States Patent
Goodwin et al.

(10) Patent No.: US 7,007,900 B2
(45) Date of Patent: Mar. 7, 2006

(54) CABLE HANGER

(75) Inventors: Kevin Goodwin, Frankfort, IL (US); Albert R. Cox, Orland Park, IL (US)

(73) Assignee: Andrew Corporation, Orland Park, IL (US)

( * ) Notice: Subject to any disclaimer, the term of this patent is extended or adjusted under 35 U.S.C. 154(b) by 41 days.

(21) Appl. No.: 10/261,876

(22) Filed: Oct. 1, 2002

(65) Prior Publication Data

US 2004/0061030 A1 Apr. 1, 2004

(51) Int. Cl.
*F16L 3/22* (2006.01)

(52) U.S. Cl. ............... 248/68.1; 248/74.4; 248/74.1
(58) Field of Classification Search ........... 248/68.1, 248/65, 67.5, 67.7, 74.1, 74.4, 74.5, 74.2; 211/59.4, 70.4, 182
See application file for complete search history.

(56) References Cited

U.S. PATENT DOCUMENTS

| | | | | |
|---|---|---|---|---|
| 3,054,587 A | * | 9/1962 | Hebenstreit | 248/74.1 |
| 3,216,683 A | * | 11/1965 | Girard | 248/68.1 |
| 3,216,685 A | * | 11/1965 | Raymond | 248/74.2 |
| 3,464,661 A | * | 9/1969 | Alesi, Jr. | 248/68.1 |
| 3,501,117 A | | 3/1970 | Soltysk | 248/71 |
| 3,592,427 A | * | 7/1971 | Misuraca | 248/68.1 |
| 3,843,083 A | | 10/1974 | Angibaud | 248/229 |
| 3,856,244 A | * | 12/1974 | Menshen | 248/67.5 |
| 3,913,187 A | * | 10/1975 | Okuda | 24/484 |
| 4,099,626 A | * | 7/1978 | Magnussen, Jr. | 211/60.1 |
| 4,264,047 A | | 4/1981 | Nelson | 248/73 |
| 4,273,465 A | * | 6/1981 | Schoen | 403/391 |
| 4,564,163 A | * | 1/1986 | Barnett | 248/71 |
| 4,637,097 A | | 1/1987 | Secord | 24/16 PG |
| 4,650,925 A | | 3/1987 | Coldren | 174/135 |
| 4,653,481 A | | 3/1987 | Howland et al. | 128/69 |
| 4,813,639 A | | 3/1989 | Midkiff et al. | 248/68.1 |

(Continued)

FOREIGN PATENT DOCUMENTS

EP 0889568 1/1999

*Primary Examiner*—Anita M. King
(74) *Attorney, Agent, or Firm*—Wood, Herron & Evans, L.L.P.

(57) ABSTRACT

A cable hanger for securing multiple cables to support structures including antenna towers and poles. The cable hanger has a hingeably-coupled pair of shell halves with recesses that, when folded, establish a pair of cable passageways. Gripping arms provided on each of the shell halves project into a corresponding one of the cable passageways for gripping a cable positioned therein. Pairs of gripping arms located on opposite shell halves have a confronting relationship for gripping the cable on diametrically opposite side surfaces.

27 Claims, 4 Drawing Sheets

U.S. PATENT DOCUMENTS

| | | | | |
|---|---|---|---|---|
| 4,905,942 A | * | 3/1990 | Moretti | 248/68.1 |
| 5,033,701 A | | 7/1991 | Kraus | 248/68.1 |
| 5,113,717 A | | 5/1992 | Plamper | 74/502.6 |
| 5,115,542 A | | 5/1992 | Gehres | 24/543 |
| 5,146,667 A | * | 9/1992 | Sherman | 29/433 |
| 5,201,484 A | | 4/1993 | Thoen | 248/68.1 |
| 5,205,520 A | | 4/1993 | Walker | 248/74.1 |
| 5,257,768 A | | 11/1993 | Juenemann et al. | 248/604 |
| 5,271,588 A | | 12/1993 | Doyle | 248/68 |
| 5,277,387 A | * | 1/1994 | Lewis et al. | 248/74.2 |
| 5,385,373 A | | 1/1995 | Love | 292/307 B |
| 5,535,969 A | * | 7/1996 | Duffy, Jr. | 248/68.1 |
| 5,568,906 A | * | 10/1996 | Hahn et al. | 248/74.1 |
| 5,612,509 A | | 3/1997 | Market | 174/53 |
| 5,615,852 A | | 4/1997 | Heidorn et al. | 248/74.5 |
| 5,653,411 A | * | 8/1997 | Picco et al. | 248/74.1 |
| 5,752,681 A | * | 5/1998 | Janssen et al. | 248/65 |
| 5,794,897 A | * | 8/1998 | Jobin et al. | 248/74.4 |
| 5,820,048 A | | 10/1998 | Shereyk et al. | 248/68.1 |
| 5,906,342 A | * | 5/1999 | Kraus | 248/74.1 |
| 5,941,483 A | * | 8/1999 | Baginski | 248/68.1 |
| 5,947,426 A | | 9/1999 | Kraus | 248/74.2 |
| 5,954,300 A | | 9/1999 | Sturies et al. | 248/68.1 |
| 5,992,802 A | | 11/1999 | Campbell | 248/68.1 |
| 6,007,388 A | | 12/1999 | Kooiman | 439/825 |
| 6,079,673 A | | 6/2000 | Cox | 248/63 |
| 6,079,685 A | | 6/2000 | Jacquemin | 248/304 |
| 6,164,604 A | * | 12/2000 | Cirino et al. | 248/74.3 |
| 6,193,195 B1 | | 2/2001 | Owens | 248/68 |
| 6,198,042 B1 | | 3/2001 | Huston | |
| 6,308,921 B1 | | 10/2001 | Borzucki | 248/68.1 |
| 6,378,813 B1 | | 4/2002 | Gretz | 248/68.1 |
| 6,536,982 B1 | * | 3/2003 | Gibbons et al. | 403/97 |
| 6,595,473 B1 | * | 7/2003 | Aoki et al. | 248/74.4 |

* cited by examiner

CABLE HANGER

FIELD OF THE INVENTION

This invention relates generally to devices for hanging cables and, in particular, to hangers for securing cables to structures including antenna poles and towers.

BACKGROUND OF THE INVENTION

Cable hangers are commonly used to secure cables to structural members of antenna poles and towers. Cables carry signals from ground-level equipment to sets of antennas attached at elevated positions on an antenna tower. Generally, each cable is attached to the antenna tower by a set of cable hangers mounted at periodically-spaced attachment points along its height. After the cable hangers have been attached to the antenna tower, the cable is strung upwardly and engaged with each of the cable hangers.

Generally, antenna poles and towers are crowded due to the multiplicity of cables required for signal-carrying. To conserve tower space, it is desirable for each set of cable hangers to have a capacity to route more than a single cable up the antenna tower. Certain cable hangers are constructed to secure multiple cables so each individual set of cable hangers can support a plurality of cables. Other cable hangers have a stackable construction that permits multiple cable hangers to be interlocked so as to extend outwardly from the antenna tower. Stacked and multiple-cable-type cable hangers significantly increase the number of cables that can be routed up the antenna tower by making efficient use of the available attachment points.

Conventional cable hangers configured to hold relatively small-diameter braided and corrugated cables suffer from significant deficiencies and shortcomings. In particular, conventional cable hangers are typically configured to handle cables of a single diameter. As a result, a unique cable hanger of suitable dimensions is required for each cable diameter. In addition, specifically-dimensioned cable hangers may be unable to accommodate variations in cable diameter arising from manufacturing tolerances and the like. This deficiency is particularly troublesome for conventional cable hangers configured to hold multiple cables. Moreover, the gripping ability of conventional cable hangers is limited because the gripped cable is merely engaged by the material forming the passageways of the cable hanger.

Therefore, it would be desirable to have a cable hanger configured for securing a plurality of cables each having a range of cable diameters and, in doing so, retaining the capability of gripping each cable with a relatively uniform gripping force about its circumference.

DETAILED DESCRIPTION OF THE INVENTION

The invention is directed to cable hangers configured for securing a plurality of, for example, two cables within a range of cable diameters and, in doing so, grip each cable with a relatively uniform gripping force about its circumference. Although the invention will be described next in connection with certain embodiments, it will be understood that the invention is not limited to those particular embodiments. On the contrary, the description of the invention is intended to cover all alternatives, modifications, and equivalent arrangements as may be included within the spirit and scope of the invention as defined by the appended claims.

Figures 1, 2:
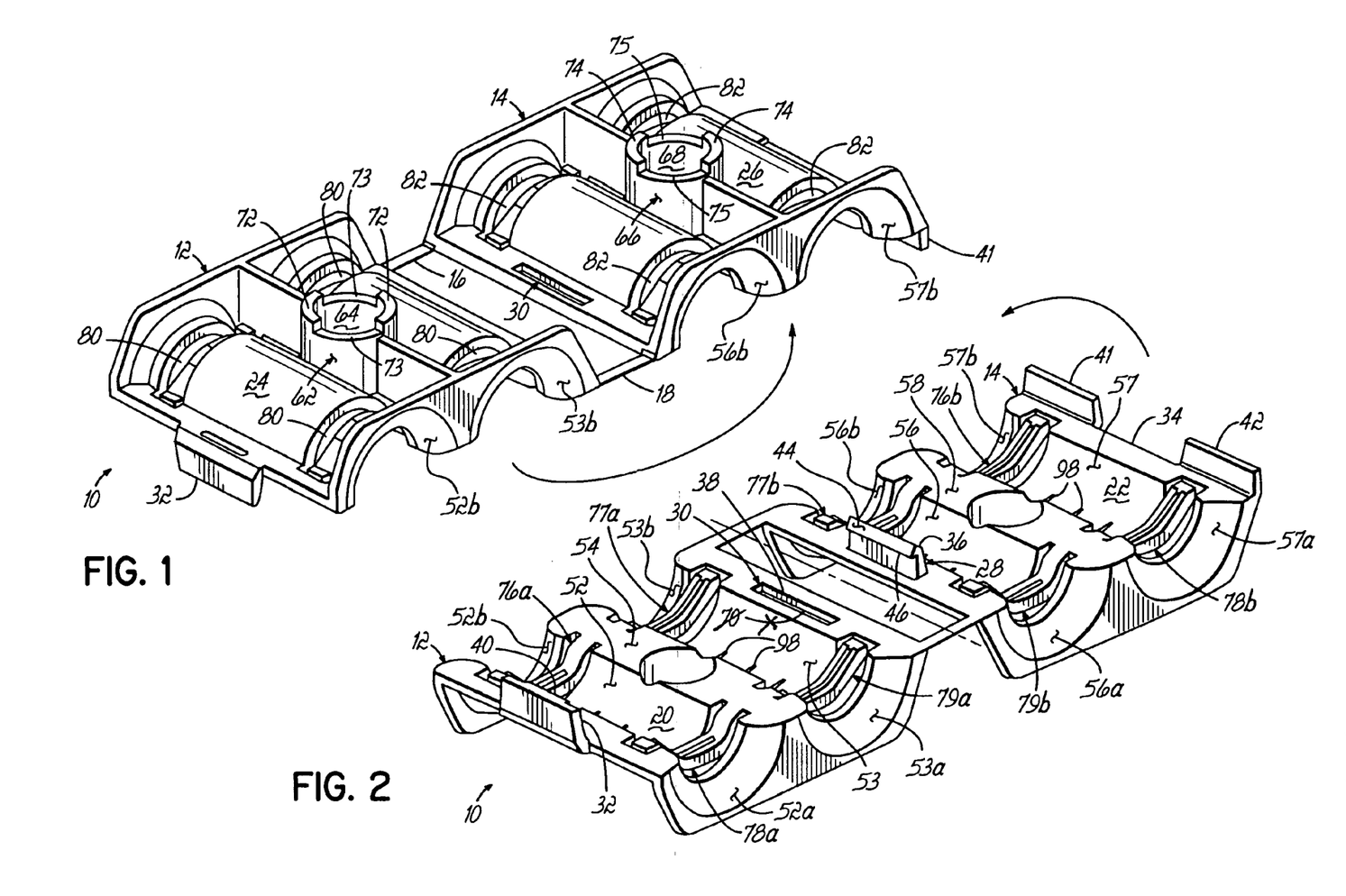
FIG. 1 is a top perspective view of a cable hanger in accordance with the principles of the invention.
FIG. 2 is a bottom perspective view similar to FIG. 1.

With reference to FIGS. 1 and 2, a cable hanger 10 of the invention includes a front shell half 12 and a rear shell half 14 hingeably joined together by a spaced-apart pair of living hinge couplings 16, 18. The shell halves 12, 14 are folded or closed one onto the other so as to create an enclosing or encasing structure. When folded, respective inner surfaces 20, 22 of the shell halves 12, 14 have a confronting relationship and respective outer surfaces 24, 26 of the shell halves 12, 14 face away from each other in opposite directions. The living hinge couplings 16, 18 are provided for temporarily coupling the shell halves 12, 14 together until folding for assembly and may be frangible. The relative thinness of the living hinge couplings 16, 18 relative to the shell halves 12, 14 facilitates the folding of the shell halves 12, 14.

Cable hanger 10 is self-locking so that the shell halves 12, 14 are retained in the folded condition. To that end, a reversible snap-fit is provided by the engagement between tongue or flange 28 and a slotted opening 30 in the front shell half 12, and the engagement between a tongue or flange 32 and a side edge 34 of the rear shell half 14. Flange 28 projects outwardly from the rear shell half 14 at a position adjacent to, and generally between, the hinge couplings 16, 18. Flange 32 projects outwardly from the front shell half 12 at a position opposite to the hinge couplings 16, 18.

With continued reference to FIGS. 1 and 2, flange 28 has a beveled head, generally indicated by reference numeral 36, that engages, and is captured by, an inner peripheral edge 38 of the slotted opening 30 in the front shell half 12. Similarly, flange 32 has a beveled head that engages, and is captured by, the side edge 34 of the rear shell half 14. A pair of guides 41, 42 project outwardly from the side edge 34 of the rear shell half 14 and have a flanking relationship with the portion of the side edge 34 engaged by a beveled head 40 of flange 32. When the shell halves 12, 14 are joined by folding at the hinge couplings 16, 18, an upwardly-facing angled camming surface 44 of flange 28 rides over the inner peripheral edge 38 of slotted opening 30, which causes flange 28 to deflect laterally. The flange 28 returns to an undeflected condition when the camming surface 44 loses contact with the inner peripheral edge 38 to provide a snap-fit, locking engagement between a lip 46 of the flange 28 and the peripheral edge 38 of slotted opening 30. Similarly, an upwardly-facing angled camming surface 48 (FIG. 4A) of flange 32 rides over the side edge 34 when the shell halves 12, 14 are joined by folding at the hinge couplings 16, 18, which causes the flange 32 to deflect laterally. The flange 32 relaxes back to an undeflected condition when the camming surface 48 and side edge 34 are non-contacting to provide a snap-fit action that results in a locking engagement between a lip 50 (FIG. 4A) of flange 32 and the side edge 34.

Figure 3:
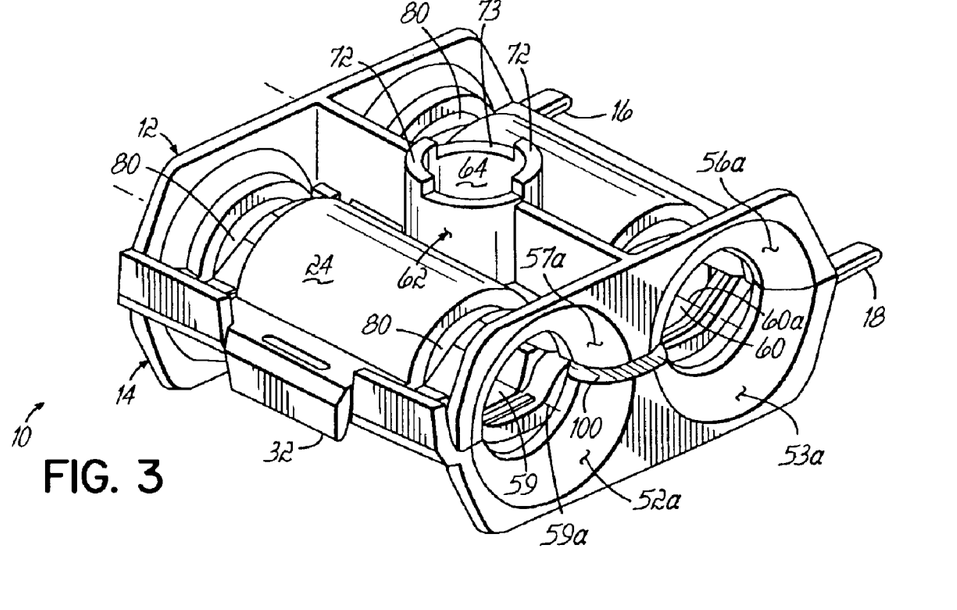
FIG. 3 is a perspective view of the cable hanger of FIG. 1 in which the shell halves are folded to a closed condition.

With reference to FIGS. 1, 2 and 3, the inner surface 20 of shell half 12 includes at least one and, typically, a plurality of, for example, two semi-circular, cylindrical recesses 52, 53 divided by a spacer portion 54 and, similarly, the inner surface 22 of shell half 14 includes at least one and, typically, a plurality of, for example, two semi-circular, cylindrical recesses 56, 57 divided by a spacer portion 58. When the shell halves 12, 14 are folded and snap-closed, recess 52 is registered with recess 56 to define a cylindrical, cable-gripping passageway 59 (FIG. 3) with a geometric centerline 59a and recess 53 is registered with recess 57 to define another cylindrical, cable-gripping passageway 60 (FIG. 3) having a geometric centerline 60a. It is appreciated that the number of cable-gripping passageways is related to the number of recesses incorporated into each cable half 12, 14. The cross-sectional profile of the passageways 59, 60 is generally circular for receiving cables 101 (FIG. 4) that are circular, oval, or elliptical. Positioned at the opposite entrances to the recesses 52, 53, 56, and 57 are corresponding radiused surfaces 52a,b, 53a,b, 56a,b, and 57a,b.

Figure 5:
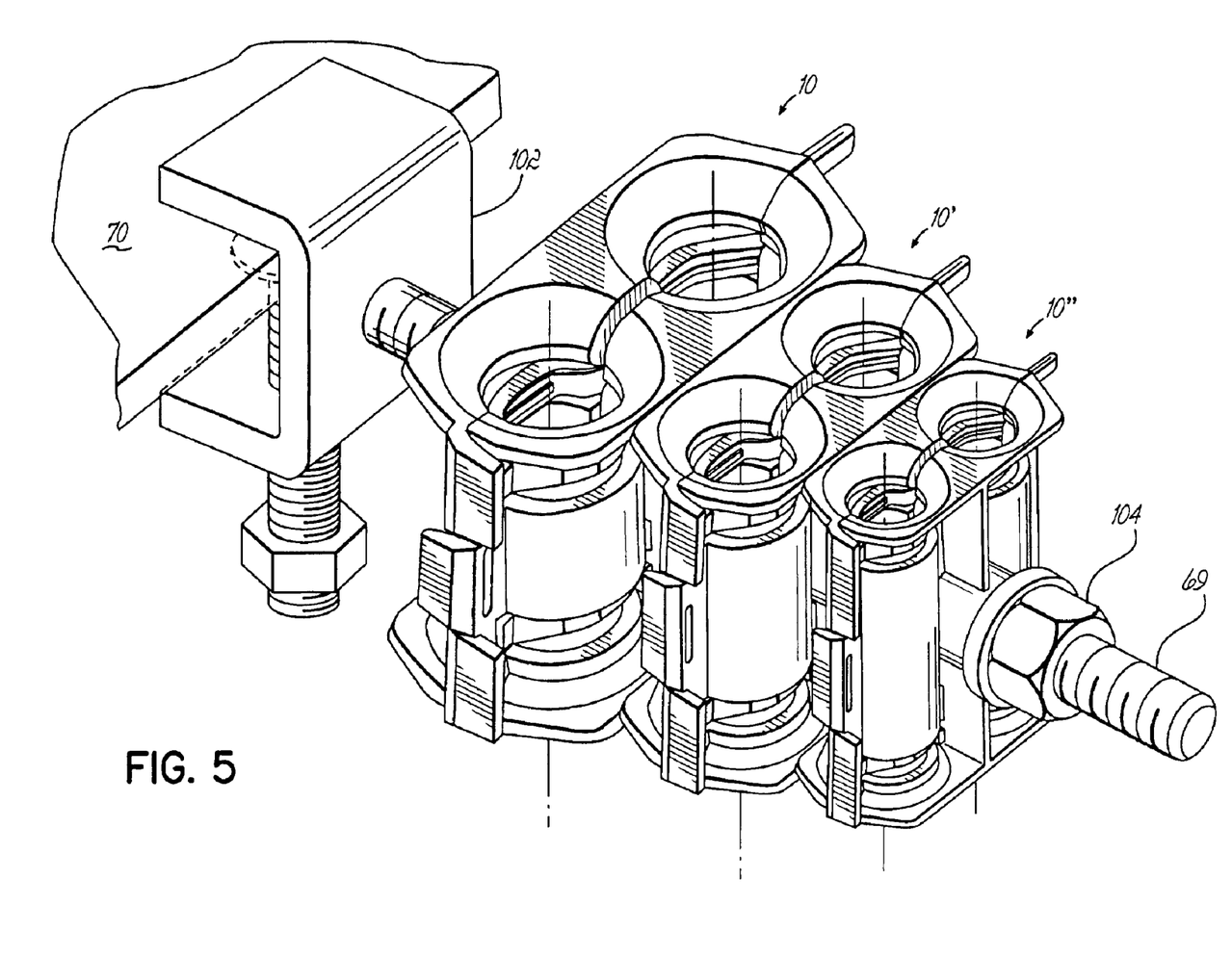
FIG. 5 is a perspective view showing an alternative embodiment of a cable hanger in accordance with the invention, comprising three pairs of shell halves of different dimensions joined together in a stacked assembly.

An annular mounting post 62 extends outwardly from the outside surface 24 of the spacer portion 54 and defines a mounting channel or fastener opening 64 having a geometric centerline extending generally perpendicular to the geometric centerline 59a of cable passageway 59. Similarly, provided between the recesses 56, 57 of shell half 14 is an annular mounting post 66 that extends outwardly from outer surface 26 of spacer portion 58 and defines a fastener opening or mounting channel 68 having a geometric centerline extending generally perpendicular to the geometric centerline of cable passageway 60. When the shell halves 12, 14 are folded, the mounting channels 64, 68 are registered to define a fastening passageway configured and dimensioned to receive, for example, a threaded rod 69 (FIG. 5) for use in securing the cable hanger 10 to a structural member 70 (FIG. 5).

With continued reference to FIGS. 1, 2 and 3, provided on mounting post 62 is a pair of circumferentially-spaced keys 72 separated by corresponding keyways 73. Similarly, a pair of circumferentially-spaced keys 74 provided on a mounting post 66 are separated by keyways 75. Each of the keys 72, 74 extends about an angular arc of about 90°. The keys 72, 74 and keyways 73, 75 permit cable hanger 10 to be stacked with other cable hangers 10. To that end, the keys 72 and keyways 73 of one cable hanger 10 are interlockable with the keys 74 and keyways 75 of a second cable hanger 10 to provide an assembly in which the two cable hangers 10 have a controlled angular relationship and are not relatively rotatable. In the folded condition, the keys 72 are angularly offset from keys 74 by about 90° so that the cable passageways 59, 60 of one cable hanger 10 are aligned generally parallel with the cable passageways 59, 60 of the other stacked cable hanger 10 when the keys 72, 74 and keyways 73, 75 are interlocked. A plurality of cable hangers 10 may be stacked in this manner with interlocked keys 72, 74 and keyways 73, 75. It is contemplated by the invention that keys 72, 74 and keyways 73, 75 may have any suitable complementary construction for interlocking multiple, stacked cable hangers 10 for aligning the cable passageways 59, 60 of one cable hanger 10 with the cable passageways 59, 60 of another cable hanger 10 and may be located at other alternative locations on the respective shell halves 12, 14. For example, one cable hanger 10 may be provided with a single key 72 on post 62 and another cable hanger 10 may be provided with a single keyway 75 on post 66 positioned and configured for engaging key 72.

Provided with a spaced relationship within recess 52 is a plurality of, for example, two cantilevered gripping arms or fingers 76a, 78a and, similarly, provided with a spaced relationship within recess 53 is a plurality of, for example, two cantilevered gripping arms or fingers 77a, 79a, each of which is flexibly attached to spacer portion 54. Similarly, recess 56 includes a spaced-apart pair of cantilevered gripping arms or fingers 77b, 79b and recess 57 includes a spaced-apart pair of cantilevered gripping arms or fingers 76b, 78b, each of which is flexibly attached to spacer portion 58. Each of the gripping fingers 76a,b, 77a,b, 78a,b, and 79a,b is received in a corresponding one of a plurality of slotted openings 80 provided in the shell half 12 or a plurality of slotted openings 82 provided in shell half 14, which provide respective unoccupied spaces for receiving the outwardly-deflected gripping fingers 76a,b, 77a,b, 78a, b, and 79a,b. Gripping fingers 76a,b, 77a,b, 78a,b, and 79a,b are aligned substantially perpendicular to an axis extending along the geometric centerline of the corresponding one of cable passageways 59, 60.

Figure 4:
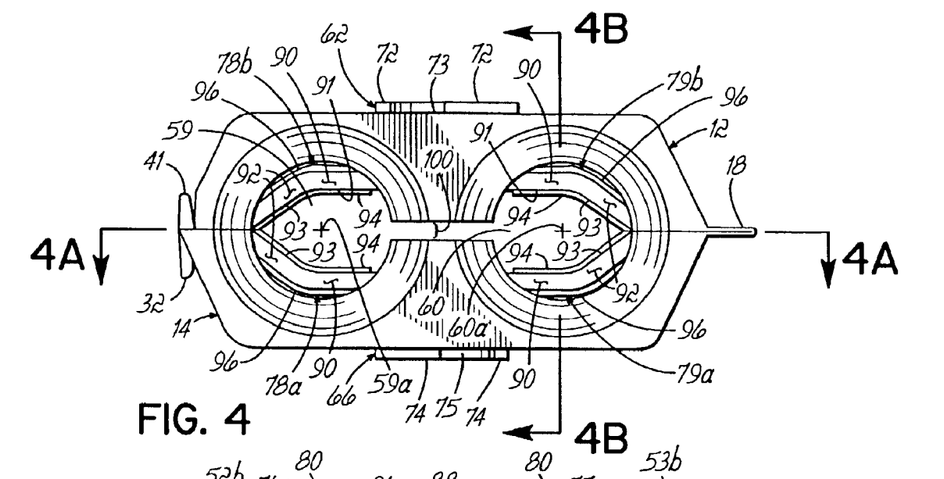
FIG. 4 is an end view of the cable hanger of FIG. 3.
Figure 4A:
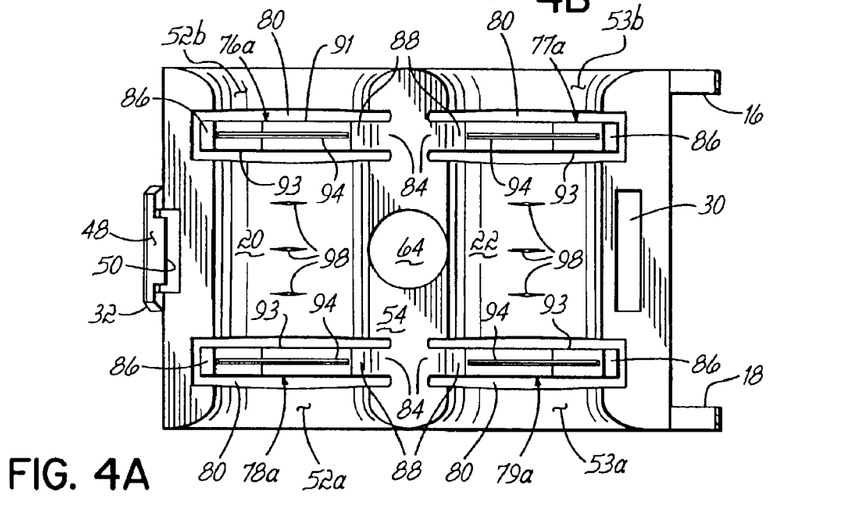
FIG. 4A is a sectional view taken generally along lines 4A—4A of FIG. 4.
Figure 4B:
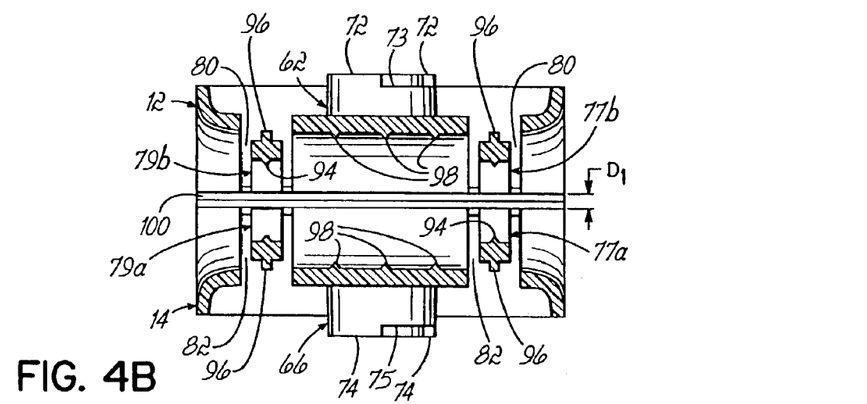
FIG. 4B is a sectional view taken generally along lines 4B—4B of FIG. 4.

With reference to FIGS. 4, 4A and 4B, gripping finger 76a extends away from a fixed end 84 attached to spacer portion 54 toward a free end 86. Because of their structural identity, the following discussion of gripping finger 76a is equally applicable to the other gripping fingers 76b, 77a,b, 78a,b, and 79a,b. Gripping finger 76a includes a first segment 88 adjacent the fixed end 84 having a concave-inward surface of substantially the same radius of curvature as recess 52. Gripping finger 76a further includes a second segment 90 having an inwardly-facing planar surface 91 and a third segment 92 having an inwardly-facing planar surface 93 inclined at an acute angle relative to planar surface 91. The planar surfaces 91, 93 project into the recess 52 so as to have a contacting relationship with a cable of a sufficient diameter positioned between recess 52 and the complementary recess 57 of shell half 14 when the shell halves 12, 14 are folded. The contact resiliently deflects gripping finger 76a from a relaxed state outwardly to apply a gripping force to the cable 101.

Extending along the planar surface 91 and the planar surface 93 is a raised rib 94 having a triangular cross-sectional profile that tapers outwardly from the surfaces 91 and 93 toward its tip. The rib 94 contacts the cable 101 to provide additional resistance against movement of the cable hanger 10 relative to the cable 101. A reinforcing rib 96 extends along the backside of the gripping finger 76a.

With continued reference to FIGS. 4, 4A and 4B, the planar surfaces 91, 93 of gripping finger 76a are generally confronting with the corresponding planar surfaces 91, 93 of gripping finger 76b when the shell halves 12, 14 are folded together. The cable 101 received in passageway 59 is contacted on generally opposite sides by gripping fingers 76a and 76b as the gripping fingers 76a,b are separated by a distance smaller than a dimension of cable 101. Similarly, the planar surfaces 91, 93 of gripping finger 78a are generally confronting with the corresponding planar surfaces 91, 93 of gripping finger 78b when the shell halves 12, 14 are folded together. The cable 101 received in passageway 59 is contacted on generally opposite sides by gripping fingers 76a and 76b and by gripping fingers 78a and 78b. A similar confronting relationship exists between the planar surfaces 91, 93 of gripping fingers 77a and 77b and the planar surfaces 91, 93 gripping fingers 79a and 79b.

Projecting outwardly from each of the recesses 52, 53, 56, 57 is a plurality of, for example, three raised gripping ribs 98 that frictionally engage the cable 101 to inhibit or otherwise prevent the cable hanger 10 from sliding along the length of the cable 101. The gripping ribs 98 are effective for supplementing the gripping ability of the gripping fingers 76a,b, 77a,b, 78a,b, and 79a,b for larger diameter cables 101 that deflect the gripping fingers 76a,b, 77a,b, 78a,b, and 79a,b sufficiently outwardly to allow contact between the cable 101 and the gripping ribs 98. Each of the gripping ribs 98 has a generally triangular cross-sectional profile capable of penetrating into the cable 101 for further improving the gripping ability for large-diameter cables 101.

Figure 4C:
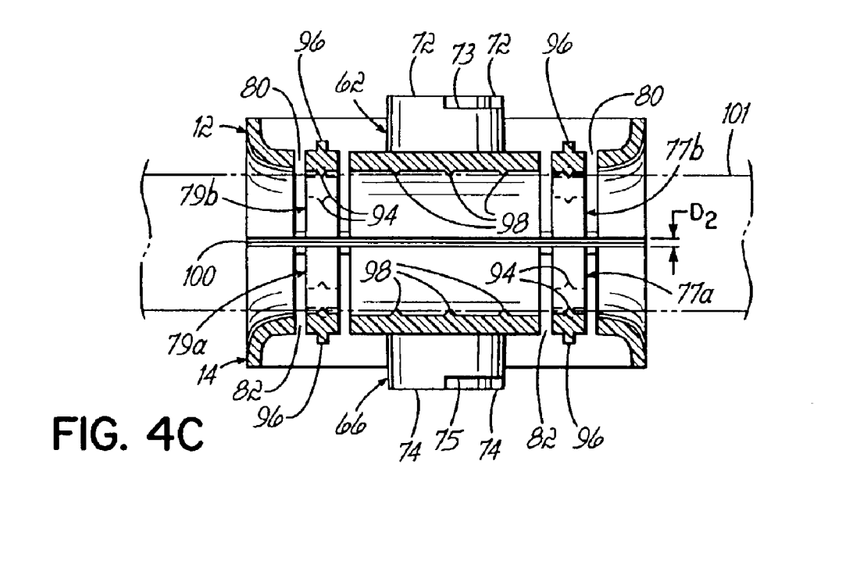
FIG. 4C is a view similar to FIG. 4B in which the shell halves of the cable hanger have been compressed together.

With references to FIGS. 4, 4B and 4C, the inner surfaces 20, 22 of the folded shell halves 12, 14 are separated at the spacer portions 54, 58 by a gap 100. Gap 100 has a width of $D_1$, as show in FIG. 4B, when the shell halves 12, 14 are folded and flanges 28 and 32 are interlocked with slotted opening 30 and side edge 34, respectively. The separation between the gripping fingers 76a,b and gripping fingers 78a,b is smaller than the diameter or other dimension of cable 101 so that deflection occurs at least when the shell halves 12, 14 are compressed together. Assuming that cable 101 is present in passageway 59, gripping fingers 76a,b and gripping fingers 78a,b are deflected outwardly into a corresponding one of the slotted recesses 80, 82 by contact with the outer surface of cable 101 when the shell halves 12, 14 are snap-fitted together.

Gap 100 narrows to a width of $D_2$ when the shell halves 12, 14 are forced or compressed together by tightening of a fastening element, such as nut 104, on the threaded rod 69 (FIG. 5) so as to decrease the spacing between inner surfaces 20, 22. The threaded rod 69 and nut 104 collectively provide a fastening member for attaching the cable hanger 10 to the structural member 70. As gap 100 narrows due to the compression, recess 52 approaches recess 57 and recess 53 approaches recess 56 so as to reduce the effective diameter of the associated cable passageway 59 to further assist in gripping the cable 101 by allowing for additional deflection of the gripping fingers 76a,b and 78a,b. The narrowing of the gap 100 from $D_1$ to $D_2$ may permit the cable 101 to contact the raised ribs 98 on the inwardly-facing surfaces of recesses 52, 57, which also provides the largest outward deflection of the corresponding pairs of gripping fingers 76a,b and 78a,b, so as to optimize the gripping or clamping force applied to cable 101. It is appreciated by persons of ordinary skill that another cable 101 is positioned within cable passageway 60 in the same manner as described above for cable 101 in cable passageway 59.

The cable hanger 10 is molded as a unitary structure from a suitable polymer resin, such as conventional thermoset or thermoplastic resins. An exemplary polymer resin is the thermoplastic resin polyoxymethylene (POM) or acetal copolymer which is commercially availabe, for example, under the CELCON® tradename from Ticona (Summit, N.J.).

In use, a cable 101 is captured within at least one of the cable passageways 59, 60 by folding shell halves 12, 14 relative one another relative to the living hinge couplings 16, 18. Gripping fingers 76a and 76b and gripping fingers 78a and 78b engage any cable 101 present in passageway 59 and, similarly, gripping fingers 77a and 77b and gripping fingers 79a and 79b engage any cable 101 present in passageway 60. Gripping fingers 76a, 76b, 78a, 78b and gripping fingers 77a, 77b, 79a, 79b are deflected outwardly into a corresponding one of the slotted openings 80, 82. The threaded rod 69 is inserted into the registered fastener openings 64, 68 and nut 104 is advanced to compress the shell halves 12, 14 together for narrowing gap 100 from its initial width of $D_1$ to a smaller width of $D_2$. The narrowing of gap 100 increases the clamping force applied by gripping fingers 76a, 76b, 78a, 78b and gripping fingers 77a, 77b, 79a, 79b to cables 101 present in cable passageways 59, 60, respectively.

With reference to FIG. 5 in which like reference numerals refer to like features in FIGS. 1–4, the cable hanger 10 of the invention may be dimensionally scaled for receiving cables 101 having a range of exterior dimensions and dimensions for cable passageways 59, 60 (FIG. 3), as illustrated by cable hangers 10, 10' and 10". Although the dimensions of the cable hangers 10, 10', and 10" differ, the diameter of the fastener openings 64, 68, the inner and outer diameters of the annular mounting posts 62, 66, and the location and angular-spacing between keys 72 and keys 74 are maintained unchanged so that cable hangers 10, 10', and 10" of different dimensions may be stacked by engaging keys 72 with keys 74. The cable hangers 10 are stacked by inserting threaded rod 69 through the aligned fastener openings 64, 68 in the folded and interlocked shell halves 12, 14 for each of three cable hangers 10, 10', and 10". The cable hangers 10, 10', and 10" are secured to the support structure 70 either vertically, horizontally or at angle to an axis of the support structure 70 using, for example, a bracket 102. Among the support structures 70 to which the cable hanger 10 may be attached are angle, round, flat, and channel members. A fastener element 104 is threadingly engaged with the threaded rod 69 and advanced to compress the shell halves 12, 14 of the cable hangers 10, 10', and 10" together for closing the respective gaps 100 and for clamping the respective cables 101 to prevent movement of each of the cable hangers 10, 10', and 10" along the length of the respective cables 101. The invention contemplates that a plurality of two or more cable hangers 10 may be stacked according to the principles of the invention and that the present invention includes, but is not limited to, the embodiment of FIG. 5. It is contemplated by the invention that the exterior dimensions of the cable hangers 10, 10' and 10" may be substantially identical and that the dimensions of the cable passageways 59, 60 may be varied for securing cables 101 of various ranges of diameters.

While the present invention has been illustrated by a description of various preferred embodiments and while these embodiments have been described in considerable detail in order to describe the best mode of practicing the invention, it is not the intention of the applicants to restrict or in any way limit the scope of the appended claims to such detail. Additional advantages and modifications within the spirit and scope of the invention will readily appear to those skilled in the art. The invention itself should only be defined by the appended claims, wherein we claim:

1. A cable hanger for mounting at least one cable to a support structure, comprising:

a first shell half having an elongated first recess and a first slotted opening;

first and third gripping arms projecting from said first shell half into said first recess at opposite ends thereof;

a second shell half configured to be brought together with said first shell half, said second shell half having an elongated second recess capable of being registered with said first recess of said first shell half to define an elongated first cable passageway when said first and said second shell halves are brought together; and second and fourth gripping arms projecting from said second shell half into said second recess at opposite ends thereof;

the first and second gripping arms opposing each other along the first cable passageway and the third and fourth gripping arms opposing each other along the first cable passageway spaced apart from the first and second gripping arms for exerting a clamping force at spaced apart positions against a first cable positioned in said first cable passageway so as to prevent movement of said cable hanger relative to the first cable, the first slotted opening positioned in the first shell half to receive the first gripping arm when the first gripping arm is in contact with the first cable in said first cable passageway.

2. The cable hanger of claim 1 wherein said first recess includes a plurality of circumferential ribs configured and positioned for contacting the first cable in said first cable passageway.

3. The cable hanger of claim 1 wherein said second recess includes a plurality of circumferential ribs configured and positioned for contacting the first cable in said first cable passageway.

4. The cable hanger of claim 1 wherein said first gripping arm includes a first rib configured and positioned for contacting the cable in said first cable passageway.

5. The cable hanger of claim 4 wherein said second gripping arm includes a second rib configured and positioned for contacting the first cable in said first cable passageway.

6. The cable hanger of claim 5 wherein at least one of said first and second ribs has a triangular cross-sectional profile.

7. The cable hanger of claim 1 wherein said first, said second, said third, and said fourth gripping arms are aligned non-parallel to a geometric centerline of said first cable passageway.

8. The cable hanger of claim 7 wherein said first, said second, said third, and said fourth gripping arms are aligned transverse to the geometric centerline of said first cable passageway.

9. The cable hanger of claim 1 wherein said second shell half has a second slotted opening that receives a portion of said second gripping arm when said second gripping arm is in contact with the first cable.

10. The cable hanger of claim 1 wherein:
said first shell half includes a third recess and a fifth gripping arm projecting into said third recess; and
said second shell half includes a fourth recess being registered with said third recess to define a second cable passageway when said first and said second shell halves are brought together, said second shell further including a sixth gripping arm projecting into said fourth recess, said fifth and said sixth gripping arms opposing each other along said second cable passageway for exerting a clamping force against a second cable positioned in said second cable passageway so as to prevent movement of said cable hanger relative to the second cable.

11. The cable hanger of claim 10 wherein said first and said second shell halves form a gap when brought together at a location between said first and said second cable passageways, the gap capable of being narrowed by moving said first shell half toward the second shell half so as to increase the clamping force applied by said first, second, third, and fourth gripping arms to the first cable and the clamping force applied by said fifth and said sixth gripping arms to the second cable.

12. The cable hanger of claim 1 wherein said first shell half includes a first mounting channel positioned proximate said first recess, and said second shell half includes a second mounting channel positioned proximate said second recess, said first and said second mounting channels being aligned when said first and said second shell halves are brought together to form a fastening passageway capable of receiving a fastening member for mounting the cable hanger to the support structure.

13. The cable hanger of claim 12 wherein said fastening passageway is aligned generally perpendicular to said first cable passageway.

14. The cable hanger of claim 12 wherein said first shell half includes an annular first post positioned proximate the first recess, said first post extending outwardly from said first shell half and defining the first mounting channel.

15. The cable hanger of claim 14 wherein said second shell half includes an annular second post positioned proximate the second recess, said second post extending outwardly from said second shell half and defining the second mounting channel.

16. The cable hanger of claim 1 wherein said first shell half includes a plurality of first keys for orienting said first cable passageway of said cable hanger relative to a cable passageway of another cable hanger.

17. The cable hanger of claim 16 wherein said second shell half includes a plurality of second keys for orienting said first cable passageway of said cable hanger relative to a cable passageway of another cable hanger.

18. The cable hanger of claim 1 wherein said first and said second shell halves are hingeably connected by at least one living hinge coupling so that said first and said second shell halves are hinged together for registering said second recess with said first recess.

19. The cable hanger of claim 1 wherein said first and said second shell halves comprise a unitary member of a polymeric resin.

20. A method of securing at least one cable to a support structure, comprising:
attaching a first cable hanger to the support surface;
inserting a first cable into an elongated first recess of a first shell half of the first cable hanger;
coupling a second shell half and an elongated second recess of the first cable hanger to the first shell half for registering the first and the second recesses to define an elongated first cable passageway surrounding the first cable;
exerting a clamping force to the first cable in the first cable passageway with first and second gripping arms opposing each other at a first end of the first cable passageway and with third and fourth gripping arms opposing each other at a second end of the first cable passageway spaced apart from the first end, the clamping force being sufficient so as to prevent movement of said first cable hanger relative to the first cable; and
allowing the first gripping arm to deflect outwardly into a slotted opening defined in the first shell half when the first and second gripping arms contact the first cable.

21. The method of claim 20 further comprising:
attaching a second cable hanger to the first cable hanger so that a second cable passageway of the second cable hanger is aligned with the first cable passageway;

inserting a second cable into a first recess of a first shell half of the second cable hanger; and joining a second shell half of the second cable hanger to the first shell half for registering the first and second recesses to define a second cable passageway surrounding the second cable.

22. The method of claim 21 further comprising:

exerting a clamping force to the second cable in the second cable passageway with fifth and sixth gripping arms opposing each other along the second cable passageway so as to prevent movement of said second cable hanger relative to the second cable.

23. The method of claim 22 further comprising:

exerting a clamping force with seventh and eighth gripping arms opposing each other along the second cable passageway and spaced apart from the fifth and sixth gripping arms so as to assist the fifth and sixth gripping arms to prevent movement of said second cable hanger relative to the second cable.

24. The method of claim 20 wherein coupling the first and second shell halves further comprises folding one of the first and the second shell halves relative to the other of the first and second shell halves about respective side edges joined by at least one hinge coupling.

25. The method of claim 20 wherein the first and second shell halves include third and fourth recesses, the method further comprising:

inserting a second cable into the third recess and forming a second cable passageway with the third and fourth recesses; and exerting a clamping force on the second cable in the second cable passageway with fifth and sixth gripping arms opposing each other along the second cable passageway so as to prevent movement of said first cable hanger relative to the second cable.

26. The method of claim 25 further comprising:

exerting a clamping force with seventh and eighth gripping arms opposing each other along the second cable passageway and spaced apart from the fifth and sixth gripping arms so as to assist the fifth and sixth gripping arms to prevent movement of said first cable hanger relative to the second cable.

27. The method of claim 20 further comprising:

allowing the second gripping arm to deflect outwardly into a slotted opening defined in the second shell half when the first and second gripping arms contact the first cable.

* * * * *